(12) United States Patent
D'Alessio

(10) Patent No.: US 7,000,127 B2
(45) Date of Patent: Feb. 14, 2006

(54) POWER SAVING CIRCUIT FOR DISPLAY SYSTEM

(75) Inventor: Samuel N. D'Alessio, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 575 days.

(21) Appl. No.: 10/135,294

(22) Filed: Apr. 30, 2002

(65) Prior Publication Data

US 2003/0204761 A1 Oct. 30, 2003

(51) Int. Cl.
G06F 1/26 (2006.01)
G06F 1/32 (2006.01)

(52) U.S. Cl. .............. 713/320; 713/300; 713/340
(58) Field of Classification Search ........... 307/125, 307/126; 345/211, 212; 713/320, 340
See application file for complete search history.

(56) References Cited

U.S. PATENT DOCUMENTS

| | | | | |
|---|---|---|---|---|
| 5,389,952 A | * | 2/1995 | Kikinis | .............. 345/212 |
| 5,616,988 A | | 4/1997 | Kim | .................. 315/1 |
| 5,671,017 A | | 9/1997 | Chujo | ............... 348/378 |
| 5,886,642 A | * | 3/1999 | Barmore, Jr. | ............ 340/644 |
| 5,961,647 A | * | 10/1999 | Kim et al. | .............. 713/300 |
| 6,275,221 B1 | | 8/2001 | Song | ................. 345/211 |
| 6,362,541 B1 | | 3/2002 | Kawata | .............. 307/125 |

OTHER PUBLICATIONS

"Display Power Management Signaling (DPMS) Standard", VESA© Video Electronics Standards Association, pp. 1-12.
"Enhanced Display Data Channel Standard", VESA© Video Electronics Standards Association, pp. 1-21.
"Digital Visual Interface DVI", DDWG Digital Display Working Group, pp. 1-76.

* cited by examiner

Primary Examiner—Lynne H. Browne
Assistant Examiner—Stefan Stoynov
(74) Attorney, Agent, or Firm—Baker Botts L.L.P.

(57) ABSTRACT

An information handling system comprises a data processing unit providing at least one control signal and a constant voltage signal, a monitor coupled with the data processing unit, wherein the monitor comprises a power saving circuitry receiving the at least one control signal and the constant voltage signal. The power saving circuitry comprises a microcontroller for monitoring the control signal comprising a supply voltage input being coupled with the constant voltage signal provided by the data processing unit, a controllable switch for coupling a power supply voltage with the monitor being controlled by the microcontroller.

8 Claims, 2 Drawing Sheets

POWER SAVING CIRCUIT FOR DISPLAY SYSTEM

FIELD OF THE INVENTION

The present invention relates to a power saving circuit, in particular to a monitor including a power saving circuit.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today's information handling systems, such as computer systems, include low energy devices which provide the capability of turning into a sleep mode when specific predefined events, such as certain signals do or do not occur. For example, modern monitors, such as a cathode ray tubes (CRT) or liquid crystal displays (LCD) comprise stand-by circuitry which turns off selectively certain high energy components when no synchronizing signals, such as, horizontal and/or vertical synchronization signals HSYNC, VSYNC, are not received for a certain time period. Thus, different sleep modes can be defined. For example, if both sync signals are absent a deep sleep mode may be initiated, whereas higher level sleep modes can be entered if only one signal is absent. To this end, such a control circuit receives a normal supply voltage or a stand-by supply voltage from the power supply unit. During sleep or stand-by mode, the high power components are usually shut off, however, the power supply either still runs with only a minimal load, such as, the low power control circuitry or the power supply unit only generates a stand-by supply voltage fed to the control circuitry and shuts off all other components.

However, these devices still require a significant amount of power during a sleep or stand-by mode. Thus, government requirements of many countries are setting an even lower power consummation during a sleep or stand-by mode to further reduce waste of energy. Existing devices, even if equipped with low power modes, will not comply with these new standards because some minimal control circuits have to be kept alive to be able to recognize a mode change, for example, to determine whether the HSYNC and/or VSYNC signals are sent from a graphics controller card to the monitor again.

SUMMARY OF THE INVENTION

Therefore, a need for an improved power saving circuit exists which provides existing functionality with a minimum of energy requirement.

A first embodiment in form of an information handling system, such as a computer system, comprises a data processing unit providing at least one control signal and a constant voltage signal, a monitor coupled with the data processing unit, wherein the monitor comprises a power saving circuitry receiving the at least one control signal and the constant voltage signal. The power saving circuitry comprises a microcontroller for monitoring the control signal comprising a supply voltage input being coupled with the constant voltage signal provided by the data processing unit, a controllable switch for coupling a power supply voltage with the monitor being controlled by the microcontroller.

Another embodiment is a power saving circuit that comprises a power supply unit, a microcontroller for monitoring an externally provided control signal, comprising a supply voltage input being coupled with an externally provided constant voltage signal, and a controllable switch being controlled by the microcontroller for coupling an externally provided power supply voltage with the power supply unit.

The controllable switch may be coupled with the microcontroller through an opto-coupler and may be a relay having a relay coil being cooupled on one side with the opto-coupler and on the other side with the power supply voltage. The system may further comprise a power supply unit being coupled with the controllable switch for generating at least one regulated voltage which is coupled with the supply voltage input of the microcontroller. Furthermore, it can comprise a switch arrangement for coupling the regulated voltage or the constant voltage with the supply voltage input of the microcontroller. The switch arrangement can comprise diodes as switching elements. The system can further comprise a power supply unit being coupled with the controllable switch for generating at least one output voltage which is coupled with the relay coil and can comprise a switch arrangement for coupling the output voltage or the power supply voltage with the relay coil. Again, the switch arrangement can comprise diodes as switching elements.

A method of operating an information handling system comprising a data processing unit and a monitor having a power supply unit, comprises the steps of:

providing a control signal for the monitor by the data processing unit;

providing a constant voltage for the monitor by the data processing unit;

monitoring the control signal by a control unit;

energizing the control unit independently from the monitor power supply unit through the constant voltage;

depending on the status of the control signal turning the power supply of the monitor on or off.

The control signal can be a horizontal sync and/or a vertical sync signal. The method can further include the step of providing the control unit with a supply voltage generated by the monitor power supply unit when the power supply unit is turned on and with a supply voltage generated from the constant voltage when the monitor power supply unit is turned off. During a deep sleep mode the constant voltage can be turned off.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
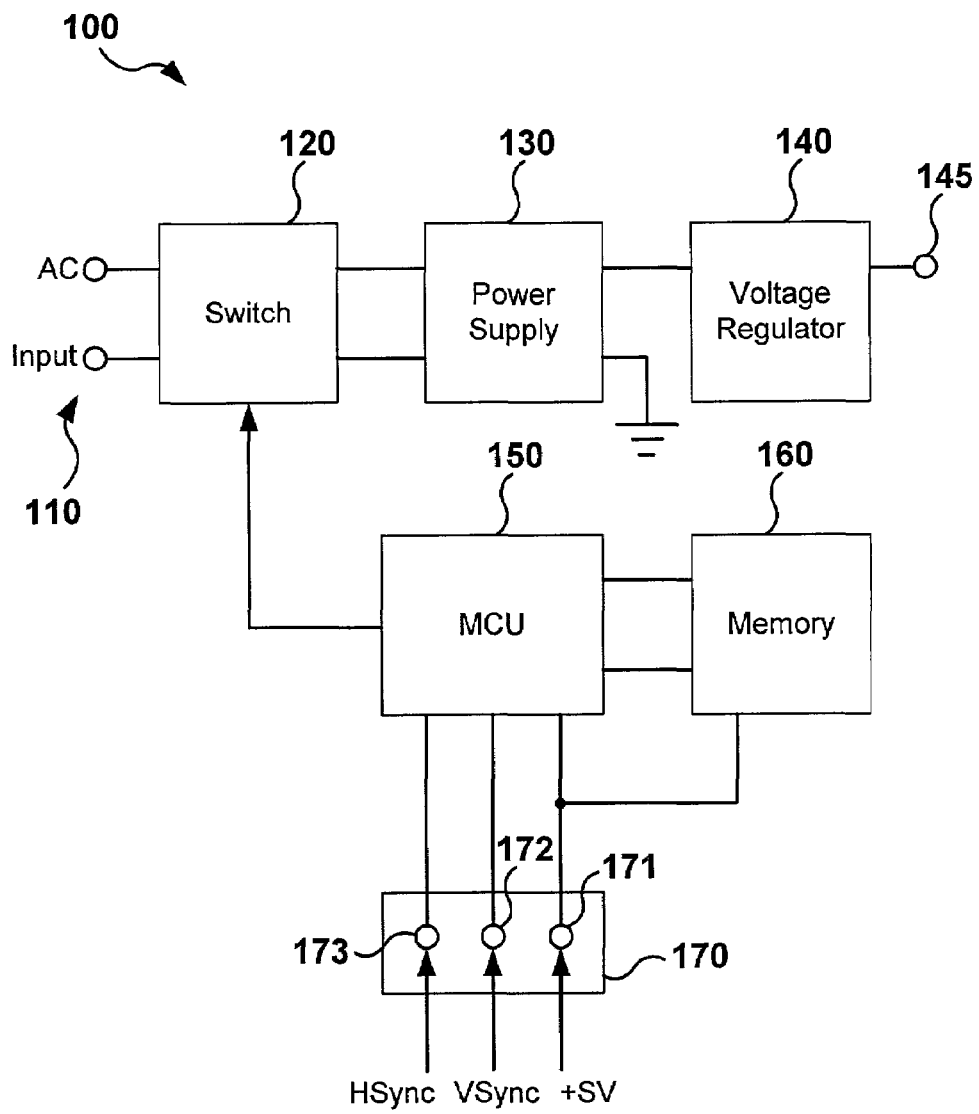
FIG. 1 is a block diagram of an exemplary embodiment according to the present invention.

Turning to the drawings, exemplary embodiments of the present application will now be described. FIG. 1 shows a block diagram of a power saving circuit 100 according to an exemplary embodiment of the present invention. The power saving circuit 100 receives AC input voltage from a standard AC outlet. The AC input voltage 110/220 is coupled with a controllable switch 120 which couples the AC input voltage 110 with a power supply unit 130. Power supply unit 130 can generate a plurality of DC and AC voltages even though FIG. 1 only shows a single output and ground. A separate voltage regulator unit 140 can be provided which regulates and stabilizes a supply voltage, such as a 5 V supply voltage accessible at terminal 145. A microcontroller unit 150 is provided which comprises a control output coupled with the control input of switch 120. The microcontroller unit 150 is coupled with a memory 160, for example, through two serial coupling lines providing a data signal and a clock signal. A peripheral connection port 170 couples the power saving circuit with an external device. For example, if the power saving circuit is implemented within a computer monitor, such as a CRT or LCD monitor, this port can be an analog SVGA port using a 15 pin D-Sub connector and/or a digital DVI-D port using a 24 pin connector, or a combined analog/digital DVI-I port. The port provides at least one input signal 172 and/or 173 and one connector within the port carries a constant voltage 171, for example, 5V. The input signals 172, 173 are coupled with two input ports of the microcontroller unit 150 and the constant voltage 171 is coupled with the supply voltage input of microcontroller unit 150 and of memory unit 160.

If the external device is not sending a signal to port 170 for a pre-defined time, the power saving circuit 100 will deactivate the device in which it is incorporated. For example, within a computer monitor, if the horizontal synchronization signal 173 and/or the vertical synchronization signal 172 are not sent for a specific time, the controlling computer system initiated a sleep mode due to no activity. Microcontroller unit 150 recognizes this status by monitoring the input signals at connectors 172 and 173. If a pre-defined time period passed without any signal activity, microcontroller 150 controls switch 120 through its control line to de-couple the AC input voltage 110 from the power supply unit 130. Thus, the device in which the power saving circuit is incorporated is completely turned off. Merely the microcontroller unit 150 and its associated memory 160 are still running to monitor activity on the input ports 172, 173. This is possible because microcontroller unit 150 and memory 160 receive a supply voltage separately from power supply unit 130 which supplies all other components within the monitor. To this end, the PC-5V signal supported by the graphics controller through the connection port 170 as defined by the VESA standard is used to supply the microcontroller 150 and the associated memory 160. Microcontroller unit 150 and memory 160 are preferably devices which require only a minimum amount of power. Thus, only a small load is put on the constant voltage at port 170 which in case of a SVGA port is not intended to support a high load as this constant voltage is merely a voltage which is used in the VESA standard to read the extended display identification data even when the monitor is turned off. However, there is enough current to externally power enough monitor circuitry so that the power saving circuitry can read the horizontal and vertical sync signals and turn on the power supply to reactivate the monitor when signals are sent by the graphics card of the computer. According to the VESA standard, the constant voltage signal can be turned off during a sleep mode. This will however not affect the functionality of the circuit because when the graphics card is sending again synchronization signals it will also power up this PC-5V signal again. The microcontroller will immediately initialize upon receipt of the power supply and monitor the input signals and couple the power supply unit 130 with the AC input voltage 110 by means of switch 120.

Figure 2:
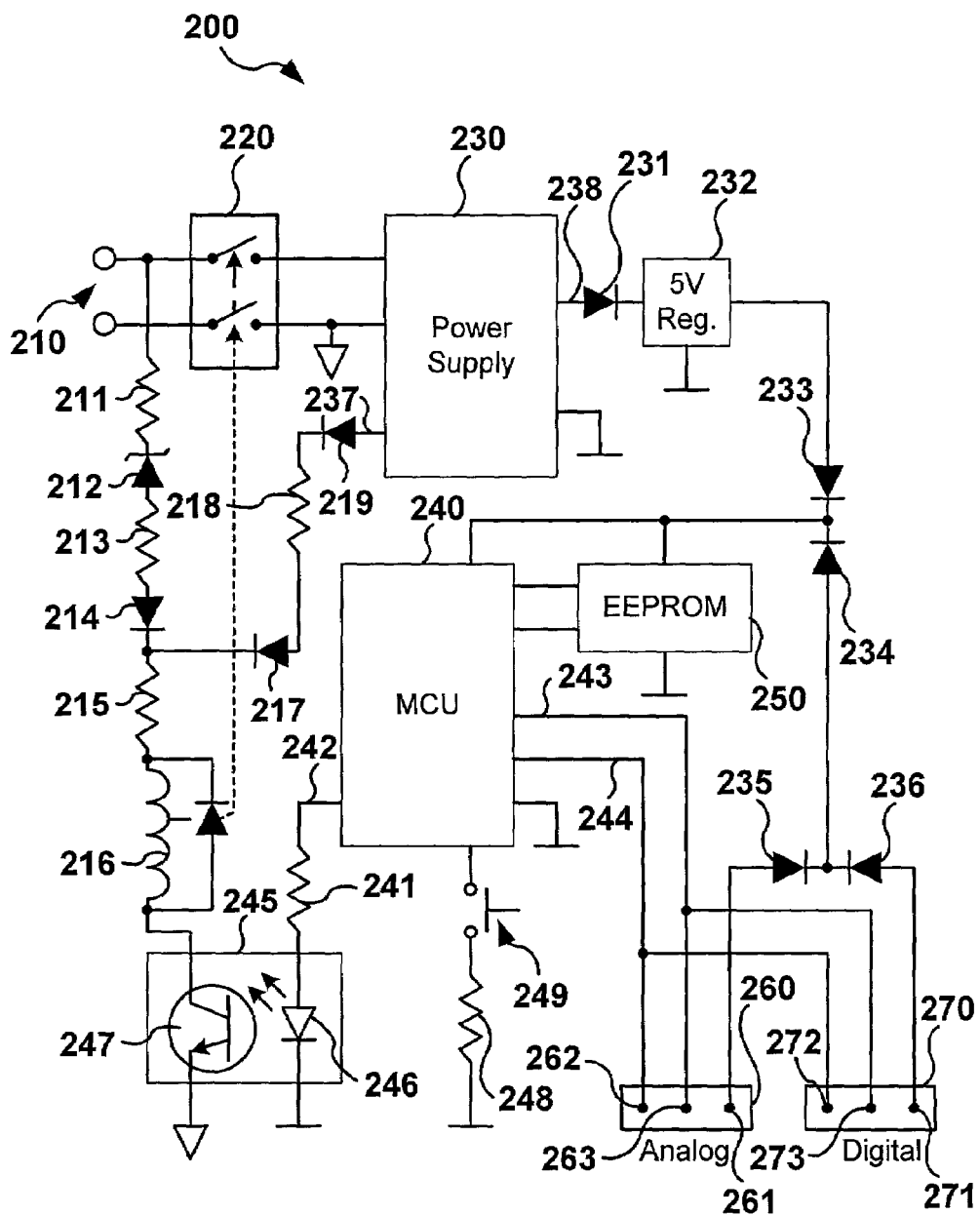
FIG. 2 is a more detailed block diagram of another exemplary embodiment according to the present invention.

FIG. 2 shows another more detailed embodiment of a power saving circuit 200 according to the present invention for use in a monitor. Again, a AC input voltage 210 is applied to a controllable switch 220, for example, a relay. Switch 220 is coupled with a power supply unit 230 comprising for example a transformer and/or a switched-mode power supply. Again, power supply unit 230 can provide a plurality of internal supply voltages. FIG. 2 only shows a first supply voltage 238 which is fed through a diode 231 to a 5v regulator 232 and a second supply voltage 237 for the relay 216. The regulated and stabilized 5V supply voltage from regulator 232 is fed through another diode 233 to the supply input of a microcontroller unit 240 and an electronically erasable programmable read only memory 250 (EEPROM). EEPROM 250 can comprise a serial interface with a clock and a data line coupled to the microcontroller unit 240. The exemplary embodiment shown in FIG. 2 comprises two input connectors 260 and 270. Numeral 260 indicates an analog input connector, for example, comprising a D-Sub connector. Only three connector pins are shown in FIG. 2 carrying the horizontal sync signal 262, the vertical sync signal 263, and the PC-5V constant voltage signal 261. Numeral 270 indicates a post decoded digital input signal, for example, comprising a signal from a DVI-D connector. Again, only three connector pins are shown in FIG. 2 carrying the decoded digital horizontal sync signal 272, the decoded digital vertical sync signal 273, and the PC-5V constant voltage signal 271. A digital video connector, such as a DVI-D connector uses transition minimized differential signaling (TMDS). Usually such a connector does not have separate horizontal vertical sync pins because the H/V sync signals are encoded in the TMDS data and do not re-emerge in their separate states until after TMDS receiver decoding. However, any other suitable signal for detecting the presence of a video signal can be used.

Each of the horizontal sync signals 262 and 272 and the vertical sync signals 263 and 273 are coupled with an input port 243 and 244 of microcontroller unit 240, respectively. PC-5V signal 261 is coupled through a first diode 235 and a second diode 234 in series with the voltage supply input of microcontroller 240 and memory 250. Likewise, PC-5V input 271 of the digital connector 270 is coupled through a diode 236 and diode 234 in series with the voltage supply input of microcontroller 240 and memory 250. A further input port of microcontroller unit 240 is coupled with a switch 249 and a resistor 248 in series with ground. An output port 242 of microcontroller unit 240 is coupled with a resistor 241 and a light emitting diode 246 in series with ground. Light emitting diode 246 is part of an opto-coupler 245. The emitter of the receiving transistor 247 of opto-coupler 245 is coupled with the hot ground of the AC-input side and the collector of transistor 247 is coupled with a first terminal of a relay coil 216 of switch 220. The other terminal of relay coil 216 is coupled with chain of resistors and diodes coupled in series between the relay coil 216 and the hot line of AC input 210. This chain comprises a first resistor 211 coupled with a zener diode 212 and a second resistor 213, a diode 214 in flow direction and a third resistor 215 coupled with the relay coil 216. A secondary supply voltage for relay 216/220 is generated by power supply unit 230. This supply voltage is fed to the node between diode 214 and resistor 215 through a diode 219 coupled in flow direction in series with a resistor 218 coupled in series with a diode 217 in flow direction.

When the monitor is in operation, relay switch 220 is closed energizing power supply unit 230. Power supply unit 230 generates its output voltages 237 and 238, wherein 238 is used to provide a 5V supply voltage through regulator 232. This supply voltage energizes microcontroller unit 240 and memory 250 through diode 233 which is used as a switch. Microcontroller unit 240 monitors the horizontal and vertical sync signals 262,263; 272, 273 from either the analog connector 260 or the digital connector 270. As long as these signals are present, microcontroller unit 240 generates an output signal energizing light emitting diode 246 of opto-coupler 245. Thus, transistor 247 off opto-coupler 245 is turned on and keeps relay coil 216 energized through the supply voltage 237 provided by power supply 230 through diodes 219, resistor 218 and diode 217.

When the microcontroller unit 240 detects a sleep mode by sensing the activity on the horizontal and vertical sync connectors 262, 263; 272, 273, it will turn of the high signal at its output port. Thus, light emitting diode 246 will no longer be energized and, therefore, transistor 247 will turn off. The relay coil 216 is, thus, de-coupled from ground and will no longer be energized and open the relay switch 220. Hence, power supply unit 230 will completely shut down and turn off voltages 237 and 238. If the respective graphics card also shuts down the PC-5V constant voltage at connector pin 261 or 271, microcontroller unit 240 and associated memory 250 will also be turned off. Thus, the complete circuitry shown in FIG. 2 will be turned off and draw no current. However, in case the graphics card reactivates its output signals thereby returning from a sleep mode, the horizontal and vertical sync signals as well as the PC-5V signal will be present. Microcontroller unit 240 and associated memory 250 will now be energized through either diodes 235 and 234 or diodes 236 and 234 and will start operating. Microcontroller unit 240 will now sense activity at the horizontal and vertical sync connection pins 262, 263 or 272, 273 and change the output port signal 242 from low to high. Thus, light emitting diode 246 will be energized and consequently transistor 247 will turn on. Because power supply unit 230 is still off, relay coil 216 will be energized through the chain formed by resistor 211, zener diode 212, resistor 213 and diode 214. Thus relay switch 220 will close and activate power supply unit 230. The voltage across diode 217 is high enough to turn on diode 217 and turn off 214. Hence, relay coil will further on be energized by power supply unit 230. Likewise, the voltage across diode 233 is high enough to turn on diode 233 and turn off diode 234. Thus, microcontroller 240 and associated memory 250 will from now on be also energized by power supply unit 230. Thus only a minimum load will be put on the PC-5V constant voltages for a very short time by means of this arrangement.

Switch 249 can additionally initiate a power down and power on routine even when signals are still present at the analog or digital connectors 260 and 270. When the power supply unit 230 is turned off through switch 249, microcontroller unit 240 and associated memory will still be active through the supply voltage PC-5V provided by the graphic controller at connector pins 261, 271, respectively. In this case the voltage across diode 234 is large enough to turn on diode 234 and diode 233 will be turned off. Another activation of switch 249 will turn on the power supply 230 as described above. The power saving circuit 200 will also enter this sleep mode with the microcontroller unit 240 running when the graphics card does not turn off the PC-5V signal during sleep mode. In either case, no power is drawn by the monitor's power supply and only very little power, namely only a few milliwatts are necessary to run the microcontroller 240 and the associated memory 250.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system comprising:
   a data processing unit operable to provide at least one control signal and a constant voltage signal;
   a monitor coupled with the data processing unit, wherein the monitor comprises a power saving circuit operable to receive the at least one control signal and the constant voltage signal and wherein the power saving circuitry comprises:
   a microcontroller operable to monitor the at least one control signal and having a supply voltage input operable to be coupled with a the constant voltage signal
   a controllable switch operable to couple a power supply voltage with the monitor;
   a power supply unit being coupled with the controllable switch for generating at least one regulated voltage which is coupled with the supply voltage input of the microcontroller; and
   a switch arrangement for coupling the regulated voltage or the constant voltage with the supply voltage signal input of the microcontroller.

2. The information handling system of claim 1, wherein the switch arrangement comprises diodes as switching elements.

3. An information handling system comprising:
   a data processing unit operable to provide at least one control signal and a constant voltage signal;
   a monitor coupled with the data processing unit, wherein the monitor comprises a power saving circuit operable to receive the at least one control signal and the constant voltage signal and wherein the power saving circuitry comprises:
   a microcontroller operable to monitor the at least one control signal and having a supply voltage input operable to be coupled with the constant voltage signal
   a controllable switch operable to couple a power supply voltage with the monitor, wherein the controllable switch is a relay coil being coupled on one side with an opto-coupler and on the other side with the power supply voltage;
   a power supply unit being coupled with the controllable switch for generating at least one output voltage which is coupled with the relay coil; and
   a switch arrangement for coupling the output voltage or the power supply voltage with the relay coil.

4. The information handling system of claim 3, wherein the switch arrangement comprises diodes as switching elements.

5. A power saving circuit comprising:
   a power supply unit;
   a microcontroller operable to monitor an externally provided control signal and comprising a supply voltage input being coupled with an externally provided constant voltage signal;
   a controllable switch configured to be controlled by the microcontroller and operable to couple an externally provided power supply voltage with the power supply unit; and
   a switch arrangement for coupling at least one regulated voltage or the constant voltage signal with the supply voltage input of the microcontroller;
   wherein the power supply unit is coupled with the controllable switch for generating the at least one regulated voltage which is coupled with the supply voltage input of the microcontroller.

6. A power saving circuit according to claim 5, wherein the switch arrangement comprises diodes as switching elements.

7. A power saving circuit comprising:
   a power supply unit;
   a microcontroller operable to monitor an externally provided control signal and comprising a supply voltage input being coupled with an externally provided constant voltage signal;
   a controllable switch configured to be controlled by the microcontroller and operable to couple an externally provided power supply voltage with the power supply unit;
   wherein the controllable switch is coupled with the microcontroller through an opto-coupler, and wherein the controllable switch is a relay having a relay coil being coupled on one end with the opto-coupler and on the other side with the externally provided power supply voltage;
   wherein the power supply unit is coupled with the controllable switch for generating at least one output voltage which is coupled with the relay coil; and
   a switch arrangement for coupling the output voltage or the externally provided power supply voltage with the relay coil.

8. The power saving circuit of claim 7, wherein the switch arrangement comprises diodes as switching elements.

* * * * *